United States Patent
Anderson et al.

(10) Patent No.: US 11,549,797 B2
(45) Date of Patent: Jan. 10, 2023

(54) DEVICE FOR DETECTING WEAR OF REPLACEABLE COMPONENTS

(71) Applicant: Deere & Company, Moline, IL (US)

(72) Inventors: Noel W. Anderson, Fargo, ND (US); Michael L. Rhodes, Richfield, MN (US)

(73) Assignee: DEERE & COMPANY, Moline, IL (US)

( * ) Notice: Subject to any disclaimer, the term of this patent is extended or adjusted under 35 U.S.C. 154(b) by 43 days.

(21) Appl. No.: 16/172,722

(22) Filed: Oct. 26, 2018

(65) Prior Publication Data

US 2020/0132431 A1 Apr. 30, 2020

(51) Int. Cl.
*G01B 7/16* (2006.01)
*G01L 1/20* (2006.01)

(52) U.S. Cl.
CPC . *G01B 7/18* (2013.01); *G01L 1/20* (2013.01)

(58) Field of Classification Search
CPC . G01B 7/18; G01N 27/20; G01N 3/56; G01L 1/20
See application file for complete search history.

(56) References Cited

U.S. PATENT DOCUMENTS

| | | | |
|---|---|---|---|
| 3,636,441 A * | 1/1972 | Fujimura | G01R 27/14 324/718 |
| 3,775,680 A | 11/1973 | Egeland | |
| 4,642,557 A * | 2/1987 | Ross | G01N 17/00 324/425 |
| 4,655,077 A * | 4/1987 | Purvis | B04C 11/00 73/86 |
| 6,456,054 B1 * | 9/2002 | Kataoka | B23Q 17/0928 324/71.2 |

(Continued)

FOREIGN PATENT DOCUMENTS

| EP | 3345840 A1 | 7/2018 |
|---|---|---|
| JP | 2000002642 A | 1/2000 |

(Continued)

OTHER PUBLICATIONS

Clingerman, Matthew Lee. "Development and Modeling of Electrically Conductive Composite Materials." PhD dissertation. Michigan Technological University, 2001 [online], [retrieved Nov. 26, 2018]. Retrieved from the Internet: <URL:http://www.chem.mtu.edu/org/ctc/pdf/mlc%20dissertation.pdf>.

(Continued)

*Primary Examiner* — Tran M. Tran
(74) *Attorney, Agent, or Firm* — McDonald Hopkins LLC

(57) ABSTRACT

A device for detecting wear of a wear member composed of electrically resistive material. The wear member comprises at least two electrodes separated from each other, where each electrode overlies, or is embedded in, an outer surface of the electrically resistive material. One of the electrodes is connected to a resistor at a measurement node to form a resistive voltage divider. A voltage measurement device measures a change in voltage at the measurement node, where the change is voltage is indicative of the degree of removal of resistive material from a face of the wear member and where the change in voltage is continuously variable and not limited to discrete wear levels.

8 Claims, 3 Drawing Sheets

(56) References Cited

U.S. PATENT DOCUMENTS

| | | | | |
|---|---|---|---|---|
| 6,534,430 | B2 * | 3/2003 | Makino | C04B 35/488 |
| | | | | 501/118 |
| 6,838,157 | B2 * | 1/2005 | Subramanian | C23C 4/18 |
| | | | | 428/173 |
| 6,982,563 | B2 * | 1/2006 | Hands | G01B 7/06 |
| | | | | 324/700 |
| 6,995,575 | B2 * | 2/2006 | Gifford | G01N 27/07 |
| | | | | 324/691 |
| 7,007,553 | B2 * | 3/2006 | Kinoshita | G01P 15/0922 |
| | | | | 73/777 |
| 7,141,990 | B2 * | 11/2006 | Bast | G01N 3/066 |
| | | | | 324/708 |
| 7,157,920 | B2 * | 1/2007 | Barber | G01N 27/20 |
| | | | | 324/700 |
| 7,270,890 | B2 | 9/2007 | Sabol et al. | |
| 7,584,669 | B2 * | 9/2009 | Dankert | F01D 21/003 |
| | | | | 73/788 |
| 7,618,712 | B2 * | 11/2009 | Sabol | C23C 4/18 |
| | | | | 428/469 |
| 7,629,871 | B2 * | 12/2009 | Schrum | H01C 10/06 |
| | | | | 345/173 |
| 7,677,079 | B2 | 3/2010 | Radziszewski et al. | |
| 7,788,799 | B2 * | 9/2010 | Schrum | H01C 10/06 |
| | | | | 338/68 |
| 8,132,467 | B2 * | 3/2012 | Shinde | G01N 3/56 |
| | | | | 73/774 |
| 8,151,623 | B2 * | 4/2012 | Shinde | G01N 3/56 |
| | | | | 73/7 |
| 8,482,306 | B2 * | 7/2013 | Andarawis | G01N 27/041 |
| | | | | 324/699 |
| 8,564,449 | B2 * | 10/2013 | Mitchell | G01M 5/0083 |
| | | | | 340/679 |
| 9,222,350 | B2 * | 12/2015 | Vaughn | E21B 47/00 |
| 9,423,369 | B2 * | 8/2016 | Fargo | D07B 1/145 |
| 9,624,729 | B2 * | 4/2017 | Sullivan | E21B 12/02 |
| 9,890,504 | B2 * | 2/2018 | Stock | E02F 5/145 |
| 10,047,566 | B2 * | 8/2018 | Vaughn | E21B 47/00 |
| 10,184,777 | B2 * | 1/2019 | Okojie | G01B 7/02 |
| 10,401,527 | B2 * | 9/2019 | Monteiro | G01V 3/38 |
| 10,598,579 | B2 * | 3/2020 | Kalhori | B23Q 17/0952 |
| 10,677,746 | B2 * | 6/2020 | Schmier, II | G01N 27/20 |
| 10,760,445 | B2 * | 9/2020 | Warren | F01D 21/003 |
| 10,843,512 | B2 * | 11/2020 | Bates | B60C 23/04 |
| 11,002,701 | B2 * | 5/2021 | Marya | G01N 27/205 |
| 11,029,273 | B2 * | 6/2021 | Minamitani | G01N 27/20 |
| 2009/0223083 | A1 * | 9/2009 | LeCrone | F16C 17/246 |
| | | | | 34/524 |
| 2010/0005895 | A1 | 1/2010 | Lv et al. | |
| 2011/0089958 | A1 * | 4/2011 | Malecki | B82Y 30/00 |
| | | | | 428/297.4 |
| 2011/0169651 | A1 | 7/2011 | Mitchell et al. | |
| 2011/0210749 | A1 | 9/2011 | Williams et al. | |
| 2012/0235693 | A1 * | 9/2012 | Feng | G01N 27/20 |
| | | | | 324/693 |
| 2017/0361719 | A1 | 12/2017 | Doucet et al. | |
| 2019/0267766 | A1 * | 8/2019 | Feustel | H01R 39/20 |
| 2022/0290985 | A1 * | 9/2022 | Jenkins | G01B 5/0014 |

FOREIGN PATENT DOCUMENTS

| | | |
|---|---|---|
| JP | 2015099083 A | 5/2015 |
| KR | 20170011600 A | 2/2017 |

OTHER PUBLICATIONS

European Search Repod issued in counterpad European Patent Application No. 19205430.2 dated Mar. 3, 2020 (11 pages).

* cited by examiner

DEVICE FOR DETECTING WEAR OF REPLACEABLE COMPONENTS

FIELD

This disclosure relates to a device for detecting wear of an electrically resistive wear member.

BACKGROUND

In off-road vehicles and equipment, some portions of the vehicle or implements may wear from contact with harvested agricultural materials, mined ore, mined materials, gravel, crushed stone, concrete or asphalt, ceramics, steel, ground, clay, sand, abrasive materials, or other materials. The off-road vehicles and equipment may use replaceable wear members from wear-resistant, durable or sacrificial materials to protect underlying structural members. The wear members are sometimes located in inaccessible locations in the equipment, implement or machinery that is difficult to inspect without incurring significant labor or maintenance costs. Accordingly, there is a need to continuously monitor wear members for signs of wear and worn or alert the operator when or that the wear member may require replacement.

SUMMARY

In accordance with one embodiment, a device for detecting wear of a wear member composed of electrically resistive material. The wear member comprises at least two electrodes separated from each other, where each electrode overlies, or is embedded in, an outer surface of the electrically resistive material. One of the electrodes is connected to a resistor at a measurement node to form a resistive voltage divider. A voltage measurement device measures a change in voltage at the measurement node, where the change is voltage is indicative of the degree of removal of resistive material from a face of the wear member and where the change in voltage is continuously variable and not limited to discrete wear levels.

DETAILED DESCRIPTION

As used in this document, adapted, configured, or arranged can be regarded as synonymous terms. Adapted, configured or arranged mean that a device, processor, interface, module, or other element is structured, designed, or programmed with electronics hardware, software, or both to facilitate or achieve a functional result or outcome that is specified. For example, a data storage device may store software, data, libraries, or software instructions that can be executed or processed by an electronic data processor to achieve a certain functional result or identified outcome.

A wear member may relate to any member that wears from engagement with a contact member, material, or the ground, among other objects or possibilities. For example, ground-engaging wear members include by are not limited to tracks for a tracked vehicle, a blade for a dozer or grader, a bucket for a loader or excavator, a drag chain or drag bar for a row unit of a planter, a ground-engaging wear plate or skid member of a combine or harvester head assembly. Other wear members may wear from interaction with harvested material such as a cutter, a blade, teeth, concave grates of combines, concave spacers of combines, impact plates or impact members of mass flow sensors on combines or harvesters, or other components of vehicles, implements, or heavy equipment. Still other wear members may wear from interaction with various components of assemblies, systems, or parts of vehicles, machinery or implements, such as axial bearings, radial bearings or thrust bearings. Although the wear member is illustrated as a block or substantially rectangular, the wear member may have virtually any geometric shape, such as substantially elliptical, substantially annular, substantially polygonal, substantially polyhedral, or otherwise.

Figure 1:
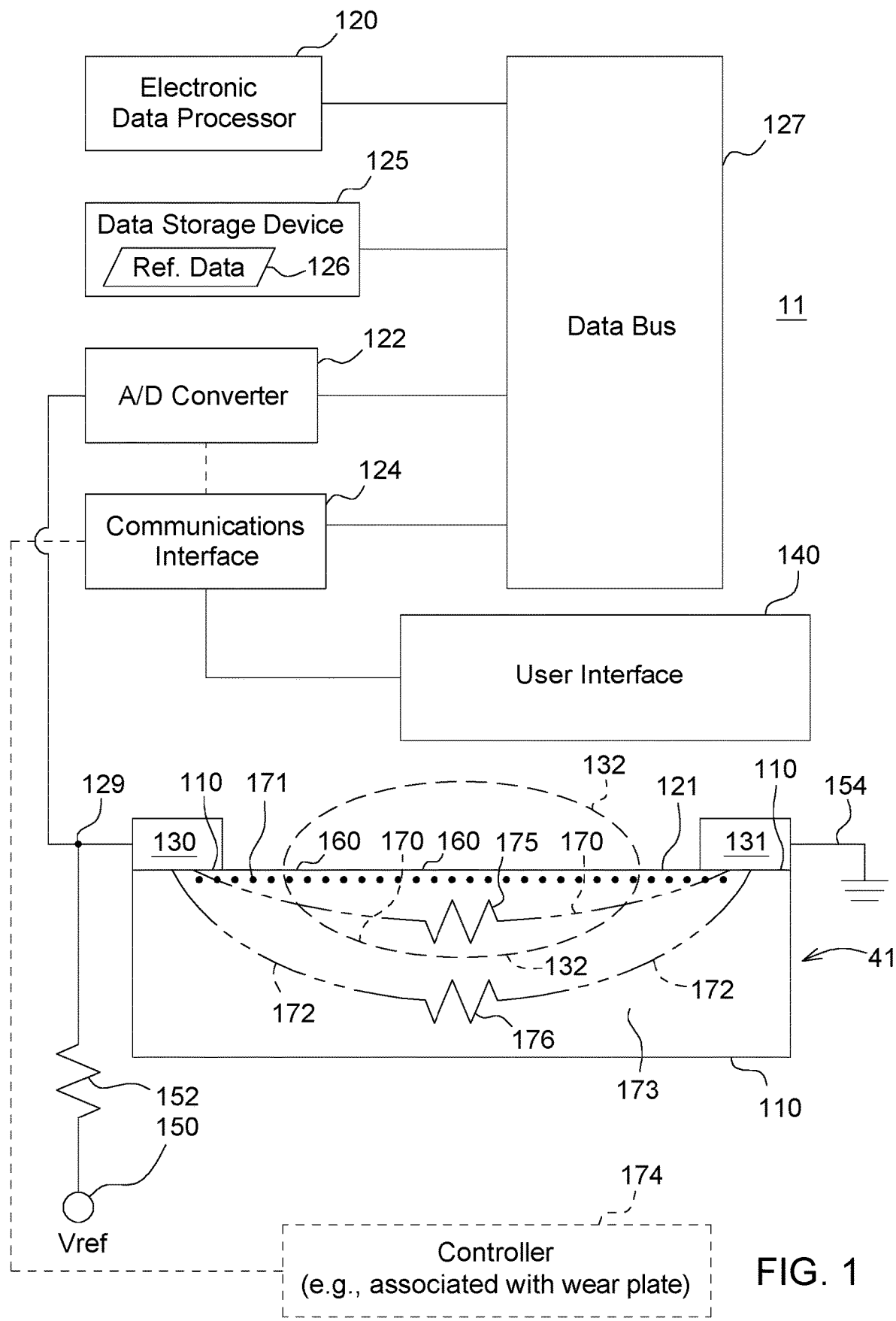
FIG. 1 is a block diagram of one embodiment of a device for detecting wear level of an electrically resistive wear member, which is illustrated in cross-section.

In accordance with one embodiment illustrated in FIG. 1, a wear detection device 11 for detecting wear of a wear member 41 comprises a wear member 41 and associated measurement circuitry. The wear member 41 is composed of electrically resistive material 173, alone or in conjunction with a dielectric substrate. The wear member 41 comprises at least two electrodes (130, 131) separated from each other, where each electrode (130, 131) overlies, or is embedded in, an outer surface 110 of the electrically resistive material 173. The electrically resistive material between a first electrode 130 and a second electrode 131 provides a resistance (175, 176) or variable resistance that varies with wear of the wear member 41.

In one embodiment, a resistor 152 is connected in series with the wear-variable resistance (175, 176) between the first electrode 130 and the second electrode 131. The first resistor 152 and the wear-variable resistance (175, 176) collectively form a resistive voltage divider. As illustrated in FIG. 1, the first electrode 130 is connected to a resistor 152 at a measurement node 129 of the resistive voltage divider. In one example, the first electrode 130 may be coupled to receive electrically energy from a positive direct current voltage terminal 150; the second electrode 131 may be coupled to ground or a negative direct current voltage terminal 154. Meanwhile, the measurement node 129 is coupled to an analog-to-digital converter 122 to provide an analog observed measurement of the observed voltage, observed current or corresponding observed resistance of the resistance (175, 176) to an input of the analog-to-digital converter 122.

In some examples, the first electrode 130 and second electrode 131 are on the same face of the outer surface 110 of wear member as the wear surface 160 that contacts a contact member 132. In other examples, one or more electrodes may be mounted on other surfaces for protection or isolation from the contact member 132 to avoid damage from the contact member 132, to better measure surface wear, or for other reasons.

A measurement device or circuitry measures a change in observed voltage, current or resistance at the measurement node 129, where the change in the observed voltage, current or resistance is indicative of the degree of removal of resistive material 173 from a face of the wear member 41 and where the change in observed voltage, current or resistance is continuously variable and not limited to discrete wear levels. As illustrated in FIG. 1, the measurement device (e.g., voltage measurement device) comprises the combination of an electronic data processor 120, a data storage device 125, an analog-to-digital converter 122, and a communications interface 124 that communicate to each other via a data bus 127, where a user interface 140 can communicate with the communications interface 124 via a transmission line, wireless communications link (e.g., of wireless transceivers), or vehicle data bus 127.

A resistive voltage divider is based on a first resistor 152 (e.g., a resistor of fixed value or discrete resistive component) that is coupled between the positive voltage direct current terminal 150 and the first electrode 130 and a second resistor of wear-variable resistance (175 or 176) that is formed by the resistive material 173 between the first electrode 130 and the second electrode 131, where the second electrode 131 is grounded or connected to a negative voltage direct current terminal 154. The wear-variable resistance (175 or 176) has variable resistance that varies with wear or time, such as a first wear-variable resistance 175 (e.g., new resistance) and a second wear-variable resistance 176 (e.g., worn resistance).

In other embodiments, a Wheatstone bridge may be used instead of a simple voltage divider or active components such as operational amplifiers may be used to amplify and condition signals.

In one embodiment, the electrodes (e.g., 130, 131) are embedded in the electrically resistive material 173. The electrically resistive material 173 may comprise carbon particles, graphite particles, or other electrically conductive particles, such as metal, metal oxide, or metal alloy fillers embedded in a plastic matrix, a polymeric matrix, or a ceramic matrix. The plastic matrix, polymeric matric or ceramic matrix comprises a binder or curable resin. For example, the electrically resistive material 173 may comprise a carbon composite material of known conductivity or resistance. The electrical resistivity may be measured as resistance per unit volume (e.g., ohms per millimeter squared), resistance per linear distance (e.g., ohms per millimeter) between the electrodes, or both. If the resistive material 173 has an isotropic or uniform resistance that is proportional to distance, wear of the wear member can be detected as a change in observed resistance, observed voltage or observed current.

In some examples, the resistivity of wear member 41 is uniform in all directions and has isotropic resistivity throughout the volume. In other examples or alternate embodiments, the resistivity of the wear member 41 may be fabricated with a non-uniform resistivity or anisotropic resistivity, such as greater resistance near the wear surface 160 or geometrically shaped resistive sections that are embedded in a dielectric material, to enable greater sensitivity to wear or certain wear profiles of the wear member.

As the wear face or wear surface 121 of wear member 41 wears from contact of a contact member 132 or other material with the wear surface 121, the electrically resistive material 173 is lost or removed from the wear member 41, such as a wear surface 121. In a first wear state or first wear level when the face is not worn, the electrical current between the electrodes takes a first path (e.g., direct path 171 indicated by dotted line in FIG. 1) of least resistance through the electrically resistive material 173 that is associated with a first wear-variable resistance 175. However, in a second wear state or second wear level when the face is partially worn, the electrical current between the electrodes can no longer take the first path (e.g., direct path 171 indicated by dotted line 171 or dashed line 170) of least resistance through the electrically resistive material 173 because the electrically conductive material associated with the first path is missing or worn away. In the second wear state or second wear level when the face is partially worn, the electrical current between the electrodes is forced to take a longer second path (e.g., curved path or indirect path (172) of least resistance through the electrically resistive material 173 that is associated with the second wear-variable resistance 176. As illustrated in FIG. 1, the first path is shorter than the second path through the electrically resistive material 173, or conversely, the second path is longer than the first path.

The wear-variable resistance (175, 176) can be configured to change a material detectable amount based on wear member dimensions and electrode placement and dimensions. In an alternate embodiment, the geometric configuration of the electrically resistive material (e.g., 173) may be structured as a thin film on, at, under or associated with the wear surface (e.g., 160) of the wear member (e.g., 41). In one example of an alternate embodiment, the wear member has an electrically resistive wear volume configured as a film and sheet resistance is in ohms per meter squared (ohms/m$^2$). As wear occurs, the wear-variable resistance will increase because the surface area increases or the film thickness is reduced, or both. The thin film resistive section is embedded in or at the surface of a dielectric body such that the wear member in the aggregate may be considered to have an anisotropic resistance profile, even if the resistance profile within the thin film resistive section is isotropic.

In another alternate embodiment, the geometric configuration of the electrically resistive material (e.g., 173) may be structured as a substantially cylindrical volume of electrically resistive material, a substantially polyhedral volume of electrically resistive material or as another geometric-shaped volume of electrically resistive material that varies in electrically resistance with wear. For example, the wear member (e.g., substantially annular, polyhedral, conical, spherical, hemispherical, pyramidal, or cylindrical outer shape) is configured with a substantially cylindrical volume of resistive material of linear length between two electrodes; the cylindrical volume has a substantially elliptical or circular cross-sectional area; there is a generally uniform resistivity per unit volume of the cylindrical volume. Accordingly, as the radius or diameter of the cylindrical volume is decreased by wear of the wear member, the resistance increases. In the alternate embodiment, the geometric resistive volume, such as the substantially cylindrical volume, can be embedded in a dielectric body or dielectric substrate of the wear member to result in an anisotropic resistance profile of the wear member in the aggregate, even if the resistance profile within the substantially cylindrical volume is isotropic.

In FIG. 1, the electronic data processor 120, data storage device 125, analog-to-digital converter 122, and communications interface 124 can communicate with each other via a data bus 127. Further, in an alternate configuration if the user interface 140 is coupled to the data bus 127, the electronic data processor 120, data storage device 125, analog-to-digital converter 122, communications interface 124, and the user interface 140 can communicate with each other via the data bus 127.

In one embodiment, the communications interface 124 may communicate with a controller 174, a user interface 140 or both via transmission lines, wirelessly or a vehicle data bus 127, for example. The controller 174 and its communications line is shown in dashed lines to indicate that the controller 174 and the communications line are optional. For example, the controller 174 may be a controller 174 associated with an actuator for controlling the settings on a machine, vehicle, implement or equipment to compensate for wear in the wear member 41 of its mechanical moving parts, such as cutters, threshers, separators, sieves, grinders, or other moving parts. For example, the electronic data processor 120 may provide a wear level or wear level data message via the communications interface 124 to the controller 174, such that the controller 174 can command an actuator: (1) to make a machine adjustment to protect the machine from damage, such as reducing or limiting a maximum rotational speed or operational torque, and/or (2) to adjust or close a gap or clearance commensurate with the wear level or wear level data message, where the wear level might be scaled to the appropriate corresponding adjustment of the gap or clearance based on the respective wear level.

An electronic data processor 120 may comprise a microcontroller, a microprocessor, a logic device, a field programmable gate array, an application specific integrated circuit, a digital signal processor or another electronic data processor.

In FIG. 1, the data processor 120 regularly, periodically or occasionally senses the voltage at a first electrode 130 or measurement node 129. When the wear member 41 is new, there is a direct path (171 or 170) between the first electrode 130 and the second electrode 131 with a new resistance as the first wear-variable resistance 175. As resistive material 173 is worn away from a wear surface 160 of the wear member 41, the electrical path lengthens to worn path or indirect path 172 with worn resistance as the second wear-variable resistance 176. Because worn path distance is longer, the resistance to current flow is higher, which means that the second wear-variable resistance 176 is higher than the first wear-variable resistance 175. Accordingly, the observed voltage or resistance measured at the measurement node 129 that is coupled to the analog-to-digital converter 122 will increase.

In one embodiment, the data processor 120 processes the time series of observed voltages (or equivalent observed currents) to a characterization of the wear of wear member 41 and generates a respective wear level or wear status data message for transmission to the user interface 140, the controller 174, or both. The data processor 120 may use reference data 126 to convert raw observed voltage data at the measurement node 129 or raw observed current data at the measurement node 129 to one or more of the following: (1) an increased surface distance between electrodes (130, 131) using wear member resistivity data, (2) a threshold-based replacement alert for the wear member 41 after a certain threshold percentage, volume or displacement of material has been removed or worn away, (3) an estimated remaining useful life (RUL) of the wear member or predictive maintenance estimate of a replacement date for a wear member 41 or associated replacement part, (4) a compensation factor for increase in wear member surface area, and (5) compensation factor based on angle of impact or contact between material and the face of the wear member.

A communications interface 124 may comprise a data communications port, a transceiver or another device that supports communication with the electronic data processor 120 and other modules via the data bus 127.

A user interface 140 may comprise an electronic display, a touch screen display, a panel of light emitting diodes, an indicator light, an alphanumeric display, a switch, a keypad, a keyboard, and/or a pointing device (e.g., mouse or trackball or pad).

An analog-to-digital converter 122 is coupled to the measurement node 129. A data storage device 125 is arranged to store reference data 126 comprising reference measurement voltage versus a wear level of the wear member 41. An electronic data processor 120 is adapted to determine the wear level or degree of removal of the resistive material 173 from the face of the wear member based on an observed change in the observed voltage (or its equivalent current) at the measurement node 129 with respect to an initial voltage or a reference voltage at the measurement node 129 associated with an initial wear member with a new face without any resistive material 173 yet removed.

A user interface 140 can provide a visual indicator, an audible indicator or both to a user that is indicative of the determined wear level of determined degree of removal of resistive material 173 from the face of the wear member, the user interface 140 coupled to the electronic data processor 120 via a communications interface 124 and a data bus 127.

The mechanical contact member 132 contacts the face or wear surface 121 of the wear member 41 and the device may measure or sense the wear level or wear state in accordance with various techniques, which may be applied separately or cumulatively.

Under a first technique, the mechanical contact member 132 has an engaging face that contacts and engages the wear face or wear surface 11 of the wear member to remove the electrically resistive material 173 over time from the initial state of wear member 41 to a partially worn state of the wear member 41. A partially worn state of the wear member 41 is associated with an observed voltage measurement (or its equivalent current measurement) within a first reference voltage measurement range between a first lower limit and a first upper limit.

Under a second technique, mechanical contact member 132 has an engaging face or wear surface 121 that contacts and engages the face of the wear member 132 or other material to remove the electrically resistive material 173 over time from the initial state of wear member 41 to a recommended replacement state of the wear member 41. Further, the recommended replacement state of the wear member is associated with an observed voltage measurement (or its equivalent current) within a second reference voltage measurement range (or its equivalent current measurement range) between a second lower limit and a second upper limit, wherein the second reference voltage range is lower than the first reference voltage range.

Under a third technique, the mechanical contact member 132 has an engaging face or wear surface 121 that contacts and engages the face of the wear member 41 to remove the electrically resistive material 173 over time from the initial state of wear member to a fully worn state of the wear member. Further, the fully worn state of the wear member 41 is associated with an observed voltage measurement (or its equivalent current) within a third reference voltage measurement range (or its equivalent current measurement range) between a third lower limit and a third upper limit, wherein the third reference voltage range is lower than the first reference voltage range and the second reference voltage range.

Figure 2:
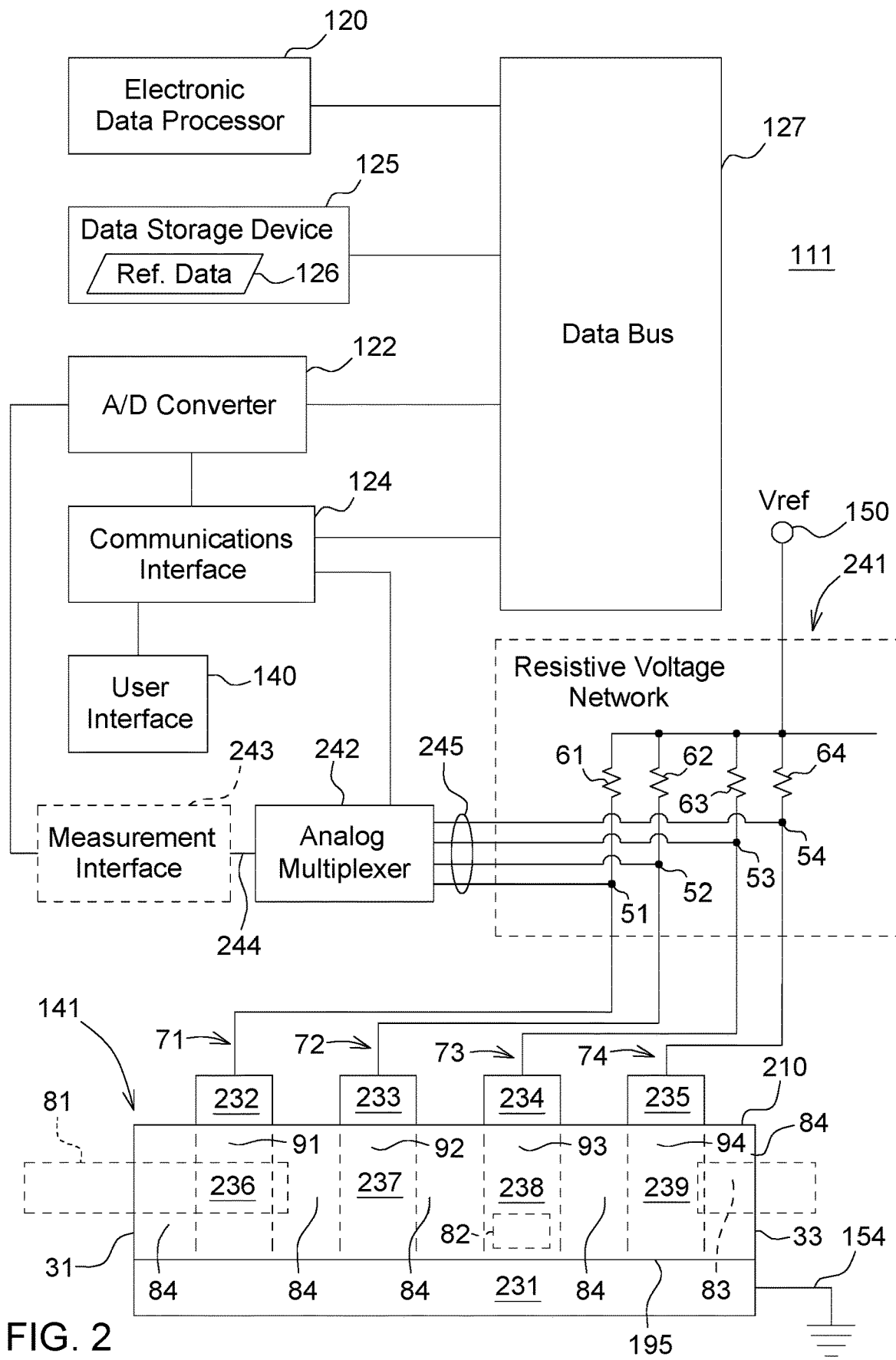
FIG. 2 is a block diagram of another embodiment of a device for detecting wear level of an electrically resistive wear member, which is illustrated in cross-section.

The wear detection device 111 of FIG. 2 is similar the wear detection device 11 of FIG. 1, except the wear detection device 111 of FIG. 2 has a plurality of primary electrodes (232, 233, 234, 235) spaced apart from each other on the outer face 210 and a secondary electrode 231 on an opposite face 195; each of the primary electrodes (232, 233, 234, 235) is associated with a respective separate resistive zone or region (236, 237, 238, 239) between ones of the primary electrodes (232, 233, 234, 235) and the secondary electrode 231. Like reference numbers in FIG. 1 and FIG. 2 indicate like elements or features.

Further, a resistive network 241 is coupled to the primary electrodes (232, 233, 234, 235). In one configuration, the resistive network 241 incorporates one or more resistors and forms a set of resistive voltage dividers (71, 72, 73, 74) to provide a different operational voltage at each corresponding measurement node 129. However, in alternate embodiment, the resistive network 241 and associated resistive voltage dividers can be deleted. The resistive network 241 is indicated by the dashed lines in FIG. 2 because it is optional, as well as the resistors shown within the resistive network 241 for illustrative purposes.

In one embodiment, an analog multiplexer 242 is coupled to the primary electrodes (232, 233, 234, 235) via the resistive network 241 to select respective ones of the primary electrodes (232, 233, 234, 235) or their respective measurement nodes (51, 52, 53, 54). In another embodiment, the analog multiplexer 242 is coupled directly to the primary electrodes (232, 233, 234, 235), without any intervening resistive network 241, to select respective ones of the primary electrodes (232, 233, 234, 235), or their respective measurement nodes.

A data storage device 125 is arranged to store reference data 126, such as reference measurement voltage versus a wear level of the wear member for each corresponding resistive zone or region (236, 237, 238, 239), or a reference current versus wear level of the wear member for each corresponding resistive zone or region (236, 236, 238, 239).

In one embodiment, in FIG. 2 the electronic data processor 120 is adapted to determine the wear level or degree of removal of the resistive material from one or more wear faces or wear surfaces of the wear member 141 based on any observed change in voltage or current at the respective measurement nodes (51, 52, 53, 54) with respect to each initial voltage or each reference voltage (or its equivalent initial current or reference current) for the corresponding resistive zone at the respective measurement node (51, 53, 53, 54). Each resistive zone is associated with a separate wear level range and wherein there are at least two respective wear level ranges, where within each wear level range the wear level is continuously variable and not limited to discrete wear levels.

A user interface 140 is arranged to provide a visual indicator, an audible indicator or both to a user that is indicative of the determined wear level of determined degree of removal of resistive material from the face of the wear member 141, the user interface 140 coupled to the electronic data processor 120 via a communications interface 124 and a data bus 127.

As illustrated in FIG. 2, a wear detection device 111 for detecting wear of a wear member comprises an electrically resistive material (within resistive regions 236, 237, 238, 239) that has one or more wear surfaces for engaging corresponding mechanical contact members (81, 82, 83) and an outer surface separate 210 from the wear surfaces.

Primary electrodes (232, 233, 234, 235) are spaced apart from each other on the outer surface 210. A secondary electrode 231 is positioned on an opposite surface to the outer surface 210 of the electrically resistive material within resistive regions (236, 237, 238, 239). Resistive regions are separated from each other. Each of the resistive regions extends in the electrically resistive material between ones of the primary electrodes (232, 233, 234, 235) and the secondary electrode 231. Although the wear member 141 has secondary electrode 231 which extends approximately the length of the wear surface 160 of wear member in FIG. 2, the secondary electrode 231 may have other shapes and lengths that fall within the scope of this disclosure. As illustrated, the secondary electrode 231 is electrically connected to ground or the negative direct current terminal.

Each primary electrode (232, 233, 234, 235) and the secondary electrode 231 form a resistor or resistance (91, 92, 93, 94) that is coupled to a restive network 241 or a first resistor 61, a second resistor 62, a third resistor 63 or a fourth resistor 64 within the resistive network 241. The first resistance region 236, between a first primary electrode 232 and the secondary electrode 231, is associated with the first resistance 91. The second resistance region 237, between a second primary electrode 233 and the secondary electrode 231, is associated with the second resistance 92. The third resistance region 238, between a third primary electrode 234 and the secondary electrode 231, is associated with the third resistance 93. The fourth resistance region 239, between a fourth primary electrode 235 and the secondary electrode 231, is associated with the fourth resistance 94. The resistance regions (236, 237, 238 and 239) are separated from each (and electrically isolated from each other) other by dielectric regions 84 or a dielectric substrate of the wear member.

A first resistor 61 and the first resistance 91 collectively form a first resistive voltage divider 71. A first measurement node 51 is at the junction of the first resistor 61 and the first resistance 91; the first measurement node 51 is coupled to a mux input 245 of the analog multiplexer 242.

A second resistor 62 and the second resistance 92 collectively form a second resistive voltage divider 72. A second measurement node 52 is at the junction of the second resistor 62 and the second resistance 92; the second measurement node 52 is coupled to a mux input 245 of the analog multiplexer 242.

A third resistor 63 and the third resistance 93 collectively form a third resistive voltage divider 73. A third measurement node 53 is at the junction of the third resistor 63 and the third resistance 93; the third measurement node 53 is coupled to a mux input 245 of the analog multiplexer 242.

A fourth resistor 64 and the fourth resistance 94 collectively form a fourth resistive voltage divider 74. A fourth measurement node 54 is at the junction of the fourth resistor 64 and the fourth resistance 94; the fourth measurement node 54 is coupled to a mux input 245 of the analog multiplexer 242.

The resistive zone or resistive region, between each primary electrode (232, 233, 234, 235) and the secondary electrode 231, may comprise a substantially cylindrical zone, polyhedral zone, annular zone, pyramidal zone, or conical zone embedded within a dielectric block and where the resistive zone has an isotropic resistance or an anisotropic resistance. The positive direct current terminal (e.g., Vref) can feed each of the resistive voltage dividers (71, 72, 73, 74) within the resistive network 241. Accordingly, the separate resistive voltage dividers (71, 72, 73, 74) and can have observed voltages or observed currents separately and independently measured by the data processor 120 and consequently, separate resistances calculated for a first resistance 91, a second resistance 92, a third resistance 93 and a fourth resistance 94 for the first resistive zone 236, the second resistive zone 237, the third resistive zone 238, and the fourth resistive zone 239, respectively.

The above resistances (91, 92, 93, 94) are variable with wear and proportional to wear of the resistive region (236, 237, 238, 239), between the primary and secondary electrodes). The wear level of each resistive region (236, 237, 238, 239) is associated with one or more contact members (81, 82, 83) that are shown in phantom as a first contact member 81 with its wear extending rightwards into the first resistive zone 236 and towards (but not yet reaching) the second resistive zone 237, where the first contact member 81 has worn through the first resistive zone 236 as illustrated in FIG. 2. A second contact member 82 is associated with the third resistive zone 238 with its wear extending into and out of the plane of the sheet of FIG. 2. A third contact member 83 is associated with the fourth resistive zone 239 with its wear extending leftward partially into the fourth resistive zone 239. In an alternate embodiment, as few as one contact member of the first contact member 81, the second contact member 82 or the third contact member 83 may be used; the other wear members may be omitted.

A resistive network 241 comprises resistive voltage dividers coupled to the primary electrodes (232, 233, 234, 235) at respective measurement nodes 129.

A measurement device (e.g., voltage measurement device) measures an observed voltage change, observed current change or observed resistance change at one or more of the measurement nodes 129 where each observed voltage, current or resistance change is indicative of a respective wear level or the respective degree of removal of resistive material from a face or one or more engaging surfaces of the wear member 141. The observed voltage change, observed current change, or corresponding observed resistance is continuously variable and not limited to discrete wear levels.

In the resistive regions (236, 237, 238, 239) the electrically resistive material of the wear member 141 further comprises a second surface opposite 33 (e.g., second face) the first surface 31 (e.g., first face) of the wear member 141, where the second surface 33 is arranged for engaging a third mechanical contact member 83; wherein the voltage measurement device 111 is configured to measure a first wear level associated with the first surface 31 of the wear member 141 and a second wear level associated with the second surface 33 of the wear member 141.

In one embodiment, the first wear level of the first surface 31 is generally correlated to the second wear level of the second surface 33. However, in other embodiments, the first wear level of the first surface 31 is independent of the second wear level of the second surface 33.

An analog multiplexer 242 is coupled to the primary electrodes (232, 233, 234, 235) via the resistive network 241 to select respective ones of the primary electrodes (232, 233, 234, 235) or their respective measurement nodes (51, 52, 53, 54). The analog multiplexer 242 enables the resistance between any two electrodes to be measured, giving a more detailed view of the wear levels for one or more wear surfaces (31, 33) of the wear member 141. The analog multiplexer 242 can selectively connect a positive voltage terminal 150 (e.g., a reference voltage or Vref) to any electrode or set of electrodes to obtain measurements of observed resistance, observed voltage or observed current at one or more measurement nodes (51, 52, 53, 54). By only enabling a single electrode at a time, issues with voltage variation between electrodes other than the two in use can be eliminated or reduced.

In an alternate embodiment, the multiplexer 242 is replaced with a switching network that can enable the observed resistance, voltage or current between any two electrodes to be measured, where the electronic data processor 120 can control the active state or inactive state of each switch within the switching network to enable measurements of observed resistance, voltage or current.

A data storage device 125 is coupled to the electronic data processor 120 via a data bus 127. The data storage device 125 can store, retrieve, access, write, modify, delete, or otherwise manipulate reference measurement voltage versus a wear level of the wear member 141 for each corresponding resistive zone or region, or reference measurement current versus wear level of the wear member 141 for each corresponding resistive zone or region.

In one embodiment, an electronic data processor 120 is adapted to determine the first wear level or degree of removal of the resistive material of the resistive regions (236, 237, 238, 239) from the first surface 31 of the wear member 141 and to determine the second wear level or degree of removal of the resistive material from the second surface 33 of the wear member 141 based on any observed change in voltage or current at the respective measurement nodes (51, 52, 53, 54) with respect to each initial voltage or each reference voltage for the corresponding resistive zone at the respective measurement node.

In one embodiment, mux inputs 245 of an analog multiplexer 242 are coupled to the resistive voltage network 241. For example, mux inputs 245 are coupled to measurement nodes (51, 52, 53, 54), which are in turn coupled to the primary electrodes (232, 233, 234, 235). Accordingly, the multiplexer 245 can select mux inputs 245 to provide to the mux output 244, where the mux inputs 245 can select to measure the observed voltage, current or resistance associated with the first measurement node 51 or first resistance 91, the second measurement node 52 or the second resistance 92, the third measurement node 53 or the third resistance 93 and the fourth measurement node 54 or the fourth resistance 94. Each resistance is associated with corresponding primary electrodes (232, 233, 234, 235) or their respective measurement nodes 129. The data processor 120 controls the multiplexer 241 to provide or select one or more mux inputs 245 to a mux output 244, such as a sequence of observed measurements (e.g., voltage, current or resistance) on mux inputs 245 to the mux output 244 over a series of clock cycles or successive time sampling periods.

In one embodiment, the analog multiplexer 242 or its mux output 244 is coupled to a measurement interface 243 that scales, adjusts, compresses, amplifies, or inverts measurement levels; matches impedance, holds samples; and/or converts current measurements to voltage measurements, or vice versa; of the analog data provided at the mux output 244 to prepare the data for the analog-to-digital converter 124, such as to fall within a range of target analog input voltages, target analog input currents, or the like. The measurement interface 243 is shown in dashed lines to indicate that it is optional.

A data storage device 125 is arranged to store reference data 126 comprising reference measurement voltage versus a wear level of the wear member 141 for each corresponding resistive zone (236, 237, 238, 239), or reference measurement current versus wear level of the wear member 141 for each corresponding resistive zone.

In one embodiment, the electronic data processor 120 is adapted to determine the wear level or degree of removal of the resistive material from the first surface of the wear member based on any observed change in voltage or current at the respective measurement nodes (51, 52, 53, 54) with respect to each initial voltage or each reference voltage (or its equivalent initial current or reference current) for the corresponding resistive zone at the respective measurement node (51, 52, 53, 54). Each resistive zone (236. 237, 238, 239) is associated with a separate wear level range and wherein there are at least two respective wear level ranges, where within each wear level range the wear level is continuously variable and not limited to discrete wear levels.

Figure 3:
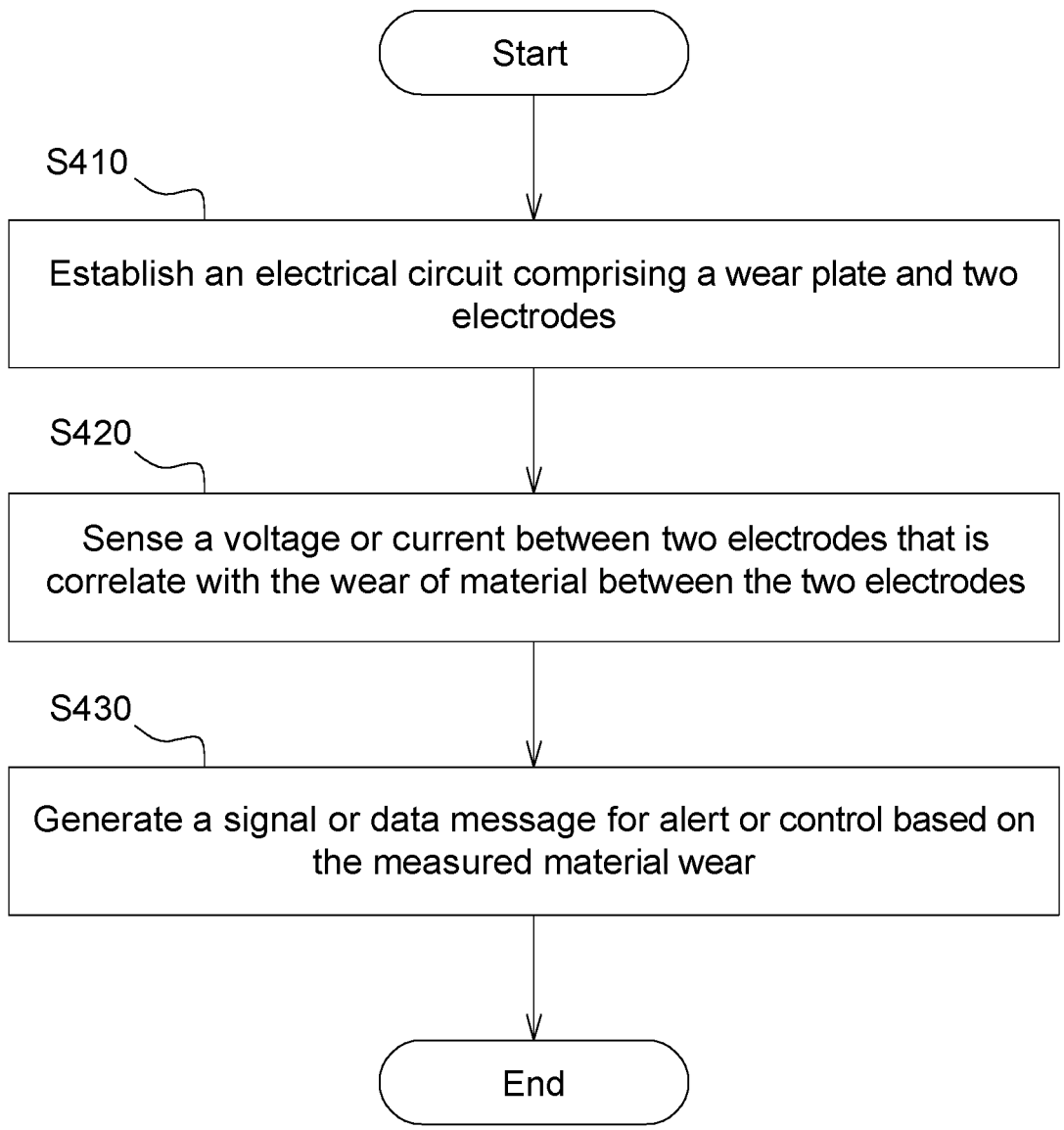
FIG. 3 is flow chart of a method for detecting wear level of an electrically resistive wear member in accordance with the device of FIG. 1, FIG. 2 or otherwise.

FIG. 3 is flow chart of a method for detecting wear level of an electrically resistive wear member in accordance with the device of FIG. 1, FIG. 2 or otherwise. The method of FIG. 3 begins in step S410.

In step S410, an electrical circuit is established through an electrically resistive material 173 of a wear member 41, or resistive regions (236, 237, 238, 239) of wear member 141, between at least two electrodes via an electrical path that is susceptible to change (e.g., lengthening) as the electrically resistive material 173, or one or more resistive regions, is worn away by contact with an engaging contact member or other material that contacts the wear member.

Step S410 may be carried out in accordance with various examples, which may be applied separately or cumulatively. In a first example, FIG. 1 features a fixed circuit by design that measures the observed voltage, observed current or corresponding observed resistance of the electrically resistive material 173 between the first electrode 130 and the second electrode 131.

In second example, FIG. 2 features a data processor 120 that can control a multiplexer 242 to select which primary electrodes (232, 233, 234, 235); hence which resistances (91, 92, 93, 94) of the wear member 141, will be measured or sampled at one or more measurement nodes (51, 52, 53, 54). The multiplexer 242 can select or poll individual measurement nodes (51, 52, 53, 54) in a predetermined sequence or in a random order; hence, corresponding resistances of the wear member 141, for sensing observed voltage, observed current or observed resistance.

In a third example, a data processor 120 can control a switching network (that replaces the multiplexer) to select or poll individual measurement nodes (51, 52, 53, 54); hence, which resistances of the wear member, will be measured or sampled as measurement nodes.

In a fourth example, a logic gate or other digital circuits may be used to selectively sample or poll the measurement nodes (51, 52, 53, 54) or different primary electrodes (232, 233, 234, 235).

In a fifth example, outputs of electronic data processor 120 selectively supply the positive direct current bus (e.g., Vref) to the resistive network 241 or to one or more voltage resistive voltage in the resistive network 241, such as different ones or selected ones of the voltage resistive dividers (71, 72, 73, 74) in a sequence or serial activation of each resistive voltage divider.

In step S420, a measurement device (e.g., voltage measurement device) senses an observed voltage or current between two electrodes that is correlated with a wear level of the electrically resistive material 173 or resistive region (236, 237, 238, 239) between the at least two electrodes. For instance, the observed voltage or observed current is a function of the change in the resistivity of the electrically resistive material 173 as some of the electrically resistive material 173 is worn away and forces the electricity to take a less direct path between the two electrodes.

In step S430, the electronic data processor 120 or user interface 140 generates a signal or data message for alert or control based on the measured material wear or wear level, which can change is continuous manner, as opposed to in discrete wear levels or steps.

Step S430 may be carried out in accordance with various techniques, which may be applied separately or cumulatively.

Under a first technique, the electronic data processor 120 generates a data message to control an actuator to compensate for wear of a wear member (41 or 141) by adjusting the clearance between members of mechanical system in which the worn wear member resides or is incorporated. For example, the electronic data processor 120 may generate a data message to control an actuator in a machine such as a grain harvester or combine to adjust the clearance between a concave and a rotor based on wear level of a wear member (e.g., concave, concave spacer, concave cover, or concave grate; or bearing, radial bearing, or axial thrust bearing) associated with the concave and rotor. Alternately, the electronic data processor 120 may limit the maximum ground speed of the harvester or combine during harvesting or a maximum threshing speed of the separator motor or concave drive motor where the wear member (e.g., bearings) are indicated at or above a threshold level requiring replacement.

Under a second technique, the electronic data processor 120 generates a data message to compensate for wear of a wear member associated with a sensor reading, such as changing the observed value of sensor reading to compensate for wear in the wear member that is incorporate into the sensor. For example, the electronic data processor 120 may generate a data message to compensate for observed grain yield or observed mass flow rate in conjunction with a worn wear member (e.g., bearing, radial bearing, axial thrust bearing, grain impact plate) to a certain wear level, such that the mass flow sensor yields a consistent wear-compensated observed grain yield or consistent wear-compensated mass flow rate over the lifetime of the wear member of the mass flow sensor and the mass flow sensor itself.

Under a third technique, the electronic data processor 120 generates a data message to generate a wear level indicator message or alert (e.g., visual alert, indicator or alarm or audio alert indicator or alarm) to an operator or user via the user interface 140. For example, the electronic data processor 120 generates a data message for any of the following: (1) recommend or suggest scheduling a service visit with a service technician or dealer via wireless communication (e.g., over the Internet) to replace a wear member (e.g., bearing or ground engaging wear member of a combine header) or serviceable component of a vehicle, machine or implement that is associated with the wear member; (2) automatically place an order via wireless communication (e.g., over the Internet) for a wear member or serviceable component of a vehicle, machine or implement that is associated with the wear member, (3) automatically display audio, visual or haptic output via the user interface 140 indicating a certain wear level of a wear member or a substantially worn level of a wear member that requires replacement.

While the disclosure has been described in detail in the drawings and foregoing description, the description shall be considered as exemplary and illustrative, rather than restrictive of the scope of protection set forth in the claims. Various illustrative embodiments have been shown and described in this document, such that any changes, variants and modifications that come within the spirit of the disclosure will fall within the scope of the disclosure and its associated claims.

The following is claimed:

1. A device for detecting wear of a wear member, the device comprising:
    an electrically resistive material having a face for engaging a mechanical contact member and an outer surface separate from the face, the electrically resistive material having a resistance that varies with an amount of removal of the electrically resistive material;
    a dielectric body in which sections of the electrically resistive material are embedded to provide an anisotropic resistance profile of the wear member;

at least two electrodes overlying the outer surface of the electrically resistive material;

a resistor;

one of the electrodes is connected to the resistor at a measurement node to form a resistive voltage divider; and a measurement device measures a change in a characteristic at the measurement node where the change in the characteristic is indicative of a change of resistance of the electrically resistive material caused by the amount of removal of resistive material from the face of the mechanical contact member, the characteristic being at least one of voltage measurement, current measurement, or resistance measurement;

wherein the electrically resistive material is a substantially cylindrical volume of linear length between the two electrodes, the substantially cylindrical volume having (i) an elliptical or circular cross-sectional area and (ii) a uniform resistivity per unit volume such that as a radius of the substantially cylindrical volume decreases, the resistance of the electrically resistive material increases.

2. The device according to claim 1 wherein the electrodes are embedded in the electrically resistive material.

3. The device according to claim 1 further comprising:

an analog-to-digital converter coupled to the measurement node;

a data storage device for storing reference data comprising reference measurement voltage versus a wear level of the wear member;

an electronic data processor adapted to determine the wear level or degree of removal of the resistive material from the face of the wear member based on an observed change in the characteristic at the measurement node with respect to an initial voltage or a reference voltage at the measurement node associated with an initial wear member with a new face without any resistive material yet removed.

4. The device according to claim 3 further comprising:

a user interface providing a visual indicator, an audible indicator or both to a user that is indicative of the determined wear level of determined degree of removal of resistive material from the face of the wear member, the user interface coupled to the electronic data processor via a communications interface and a data bus.

5. The device according to claim 1 further comprising:

the mechanical contact member having an engaging face that contacts and engages the face of the wear member to remove the electrically resistive material over time from the initial state of wear member to worn states of the wear member, wherein a partially worn state of the wear member is associated with an observed characteristic measurement within a first reference measurement range between a first lower limit and a first upper limit.

6. The device according to claim 5, wherein a recommended replacement state of the wear member is associated with the observed characteristic measurement within a second reference measurement range between a second lower limit and a second upper limit, wherein the second reference range is lower than the first reference range.

7. The device according to claim 6, wherein a fully worn state of the wear member is associated with an observed voltage measurement within a third reference measurement range between a third lower limit and a third upper limit, wherein the third reference range is lower than the first reference range and the second reference range.

8. The device according to claim 1, wherein the measurement device measures the change in the characteristic at the measurement node at multiple times to generate a time series of observed characteristics and characterizes the wear of the wear member.

* * * * *